United States Patent [19]

Blount

[11] 3,962,111

[45] June 8, 1976

[54] PROCESS FOR THE PRODUCTION OF SILICO-FORMIC ACID GRANULES CONTAINING AN ALKALI CATALYST

[76] Inventor: David H. Blount, 5450 Lea St., San Diego, Calif. 92105

[22] Filed: Apr. 21, 1975

[21] Appl. No.: 569,952

[52] U.S. Cl............................ 252/182; 252/313 S; 423/325; 423/331; 423/332; 106/288 B
[51] Int. Cl.$^2$.................. C01B 33/12; C01B 33/18; C01B 33/00
[58] Field of Search...................... 252/182, 313 S; 423/326, 331, 332, 325, 336; 106/288 B

[56] References Cited
UNITED STATES PATENTS
1,129,320  2/1915  Vail et al. ............................ 423/326
3,473,890  10/1969  Reinhardt et al. .................. 423/332

OTHER PUBLICATIONS

Iler, "The Colloid Chemistry of Silica and Silicates," Cornell University Press, 1955, p. 91.
Hackh's Chemical Dictionary, McGraw Hill, 1969, pp. 387, 610, 611.

*Primary Examiner*—Benjamin R. Padgett
*Assistant Examiner*—Irwin Gluck

[57] ABSTRACT

A dry alkaline earth metal metasilicate or an alkali metal metasilicate is chemically reacted with a concentrated mineral acid or an alkali metal hydrogen salt to produce silico-formic acid and a salt. The silico-formic acid is washed with water to remove the salt, washed with an alkali metal carbonate solution, filtered, then air dried.

6 Claims, No Drawings

PROCESS FOR THE PRODUCTION OF SILICO-FORMIC ACID GRANULES CONTAINING AN ALKALI CATALYST

SUMMARY OF THE INVENTION

The present invention relates to a process for the production of silico-formic acid granules containing an alkali catalyst. It is produced by chemically reacting a dry alkaline earth metal metasilicate or an alkali metal metasilicate with a concentrated mineral acid or an alkali metal hydrogen salt. The salt produced in this reaction is removed by washing and filtering, leaving a white granular compound, silico-formic acid. A dilute solution of an alkali metal carbonate is added to the silico-formic acid until the pH is 10–11. The silico-formic acid is then filtered and air dried, leaving a residue of an alkali metal carbonate in the granules of silico-formic acid.

The present invention reacts one mol of a dry alkaline earth metal metasilicate or an alkali metal metasilicate with one mol of a concentrated mineral acid or with two mols of an alkali metal hydrogen salt. Sodium metasilicate pentahydrate and concentrated sulfuric acid are usually used to produce silico-formic acid; sodium carbonate is usually used as the catalyst.

Various other alkali compounds may be used as the catalyst such as sodium hydroxide, potassium hydroxide, potassium carbonate, sodium oxide, potassium oxide, alkali metals and other alkali metal carbonates, alkali metal hydroxides, and alkali metal oxides.

I have discovered that silico-formic acid granules containing an alkali catalyst may be reacted chemically with organic compounds such as organic halides, organic sulfates, alcohols, glycols, phenols, ureas, aldehydes, ketones, unsaturated hydrocarbons, furans, lignin, amines, nitriles, isonitriles, diisonitriles, sulfides, and other organic compounds. It may also be copolymerized with organic compounds by a peroxide. Silico-formic acid may be used in the polymerization of many plastics, elastomers and natural products; it may also be used as a filler in elastomers, resins, molding powders and pigments, as gas and oil absorbents, as a vehicle for insecticides and aromatics and in paints and coatings.

Silico-formic acid granules containing an alkali catalyst are readily soluble in dilute solutions of alkali metal hydroxides and solutions containing a salt of a weak acid and a strong alkali metal. These solutions may be used as an adhesive and coating agent.

The primary object of the present invention is to produce silico-formic acid granules containing an alkali catalyst. A further object is to provide a silicon compound which will readily react with organic and inorganic compounds to form new and useful compounds. Still another object is to produce a silicon compound that is readily soluble in dilute alkali metal hydroxide solutions.

DESCRIPTION OF THE PREFERRED EMBODIMENTS

My invention will be illustrated in greater detail by the specific examples which follow, it being understood that these are merely illustrative of, and not limited to, procedures which may be used in the production of silico-formic acid granules containing an alkali catalyst.

EXAMPLE I

Sodium metasilicate pentahydrate is slowly added to concentrated sulfuric acid in the ratio of 1:1 mols over a period of 15–45 minutes, while aggitating and keeping the temperature between 25°–85° C. Oxygen is evolved, and considerable heat is produced. The reaction is completed in 4–12 hours, producing silico-formic acid and sodium sulfate. The mixture is washed with water and filtered, leaving a white granular compound, silico-formic acid. The silico-formic acid granules are then washed with an aqueous solution containing 10–25% sodium carbonate until the pH is 10–11. The above solution is then filtered off; the silico-formic acid granules containing the residual portion of the sodium carbonate solution are then air dried at 25°–85° C.

EXAMPLE II

Sodium metasilicate pentahydrate and sodium hydrogen sulfate are mixed in the ratio of 1:2 mols. Oxygen begins to evolve in 4–5 minutes, and considerable heat is produced in the reaction. The reaction is complete in 4–8 hours, producing a white granular mixture of silico-formic acid and sodium sulfate. The mixture is washed with water and filtered to remove the sodium sulfate from the silico-formic acid. The silico-formic acid is then washed with an aqueous solution containing 10–25% sodium carbonate until the pH is 10–11, then filtered and air dried, leaving a residue of sodium carbonate in the silico-formic acid granules.

What is claimed as new and desired to be protected by Letters Patent is set forth in the appended Claims.

1. A process for the production of silico-formic acid granules containing an alkali metal carbonate by the following steps:
  a. dry granular alkali metal metasilicate is slowly added to concentrated mineral acid in the ratio of 1:1 mols over a period of 15–45 minutes, while aggitating and keeping the temperature between 25°–85° C; the chemical reaction is completed in 4–12 hours, thereby
  b. producing a white granular mixture of silico-formic acid and salt; then by
  c. washing with water and filtering, the salt is removed, thereby
  d. recovering the silico-formic acid; then
  e. a residue of alkali metal carbonate is added to the silico-formic acid by adding an aqueous solution containing 10–25% alkali metal carbonate until the pH is 10–11, then filtering and air drying at 25°–85°, thereby
  f. producing a fine white granular mixture, silico-formic acid containing a residue of alkali metal carbonate.

2. The method of claim 1 wherein the alkali metal metasilicate is sodium metasilicate pentahydrate.

3. The method of claim 1 wherein the concentrated mineral acid is sulfuric acid.

4. The method of claim 1 wherein the alkali metal carbonate is sodium carbonate.

5. The method of claim 1 wherein the alkali metal carbonate is sodium bicarbonate.

6. The method of claim 1 wherein the alkali metal carbonate is potassium carbonate.

* * * * *